US009365084B2

(12) United States Patent
Hinque

(10) Patent No.: US 9,365,084 B2
(45) Date of Patent: Jun. 14, 2016

(54) SELF-INFLATING TIRE AND PRESSURE REGULATOR

(71) Applicant: The Goodyear Tire & Rubber Company, Akron, OH (US)

(72) Inventor: Daniel Paul Luc Marie Hinque, Habay-la-Neuve (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 219 days.

(21) Appl. No.: 14/103,140

(22) Filed: Dec. 11, 2013

(65) Prior Publication Data

US 2015/0158351 A1 Jun. 11, 2015

(51) Int. Cl.
*B60C 23/12* (2006.01)
(52) U.S. Cl.
CPC ........................................ *B60C 23/12* (2013.01)
(58) Field of Classification Search
CPC ....................................................... B60C 23/12
See application file for complete search history.

(56) References Cited

U.S. PATENT DOCUMENTS

| 3,867,973 | A | * | 2/1975 | Cozzolino et al. | ............. 152/153 |
| 4,922,984 | A | * | 5/1990 | Dosjoub et al. | ................ 152/415 |
| 5,472,032 | A | * | 12/1995 | Winston et al. | ................ 152/415 |
| 7,225,845 | B2 | * | 6/2007 | Ellmann | ......................... 152/426 |
| 8,042,586 | B2 | * | 10/2011 | Losey et al. | ..................... 152/426 |
| 2010/0243121 | A1 | * | 9/2010 | Eigenbrode | ..................... 152/419 |
| 2011/0146867 | A1 | * | 6/2011 | Benedict | ......................... 152/426 |
| 2012/0073716 | A1 | * | 3/2012 | Benedict | ......................... 152/429 |
| 2012/0125504 | A1 | * | 5/2012 | Delgado et al. | ................ 152/429 |
| 2012/0125510 | A1 | * | 5/2012 | Delgado et al. | ................ 152/548 |
| 2012/0241064 | A1 | * | 9/2012 | Hinque et al. | ................. 152/418 |
| 2013/0008579 | A1 | * | 1/2013 | Delgado | ......................... 152/523 |
| 2013/0048176 | A1 | * | 2/2013 | Hinque | ........................... 152/450 |
| 2013/0048177 | A1 | * | 2/2013 | Hinque | ........................... 152/450 |
| 2013/0048178 | A1 | * | 2/2013 | Hinque | ........................... 152/450 |
| 2013/0061996 | A1 | * | 3/2013 | Delgado et al. | ................ 152/523 |
| 2013/0081745 | A1 | * | 4/2013 | Delgado et al. | ................ 152/450 |
| 2013/0112328 | A1 | * | 5/2013 | Hinque et al. | ................. 152/450 |
| 2013/0112329 | A1 | * | 5/2013 | Hinque et al. | ................. 152/450 |
| 2014/0000778 | A1 | * | 1/2014 | Gobinath | ........................ 152/450 |
| 2014/0020805 | A1 | * | 1/2014 | Gobinath et al. | .............. 152/450 |
| 2014/0027030 | A1 | * | 1/2014 | Frantzen et al. | .............. 152/450 |
| 2014/0027031 | A1 | * | 1/2014 | Frantzen | ........................ 152/450 |
| 2014/0027032 | A1 | * | 1/2014 | Frantzen et al. | .............. 152/450 |
| 2014/0027033 | A1 | * | 1/2014 | Frantzen et al. | .............. 152/450 |
| 2014/0102610 | A1 | * | 4/2014 | Lin | ................................. 152/450 |
| 2014/0102621 | A1 | * | 4/2014 | Losey | ............................. 156/95 |
| 2014/0110029 | A1 | * | 4/2014 | Benedict et al. | .............. 152/429 |
| 2014/0158266 | A1 | * | 6/2014 | Hinque | ........................... 152/450 |
| 2014/0158267 | A1 | * | 6/2014 | Gobinath et al. | .............. 152/450 |
| 2014/0174619 | A1 | * | 6/2014 | Hinque | ........................... 152/450 |
| 2014/0174620 | A1 | * | 6/2014 | Hinque | ........................... 152/450 |
| 2014/0360643 | A1 | * | 12/2014 | Collette et al. | ................ 152/450 |
| 2015/0059951 | A1 | * | 3/2015 | Hinque | ........................... 152/450 |
| 2015/0122388 | A1 | * | 5/2015 | Durr | .............................. 152/450 |
| 2015/0122390 | A1 | * | 5/2015 | Durr | .............................. 152/450 |

* cited by examiner

*Primary Examiner* — Jeffrey J Restifo
*Assistant Examiner* — Erez Gurari
(74) *Attorney, Agent, or Firm* — June E. Rickey

(57) ABSTRACT

A self-inflating tire assembly includes an air tube connected to a tire and defining an air passageway, the air tube being composed of a flexible material operative to allow an air tube segment opposite a tire footprint to flatten, closing the passageway, and resiliently unflatten into an original configuration. The air tube is sequentially flattened by the tire footprint in a direction opposite to a tire direction of rotation to pump air along the passageway to a regulator device. The regulator device regulates the inlet air flow to the air tube and the outlet air flow to the tire cavity.

17 Claims, 14 Drawing Sheets

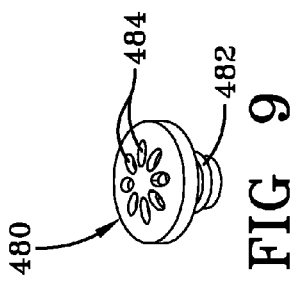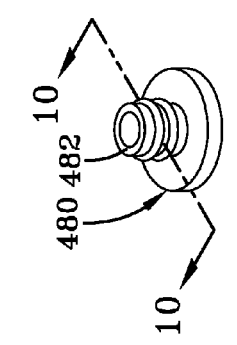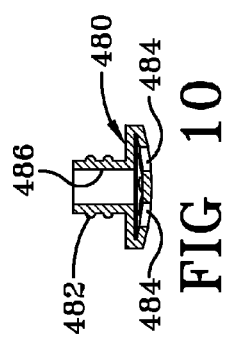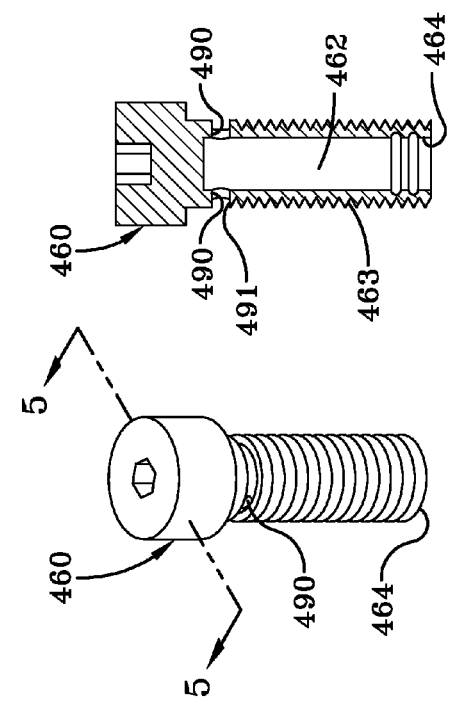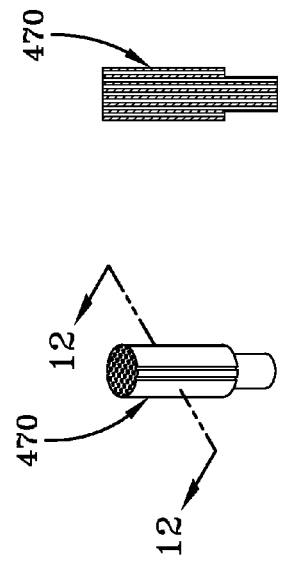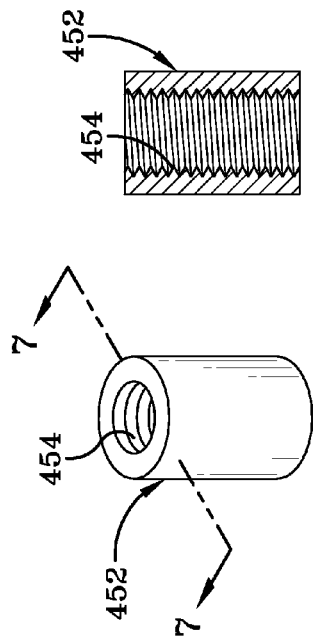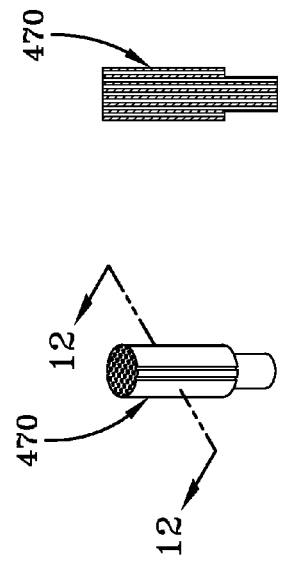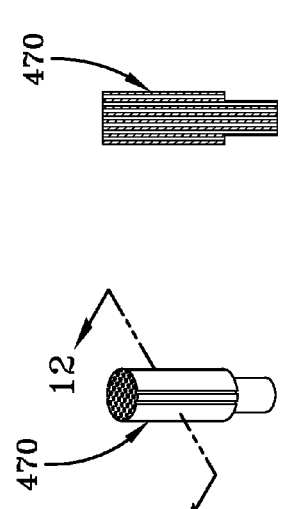

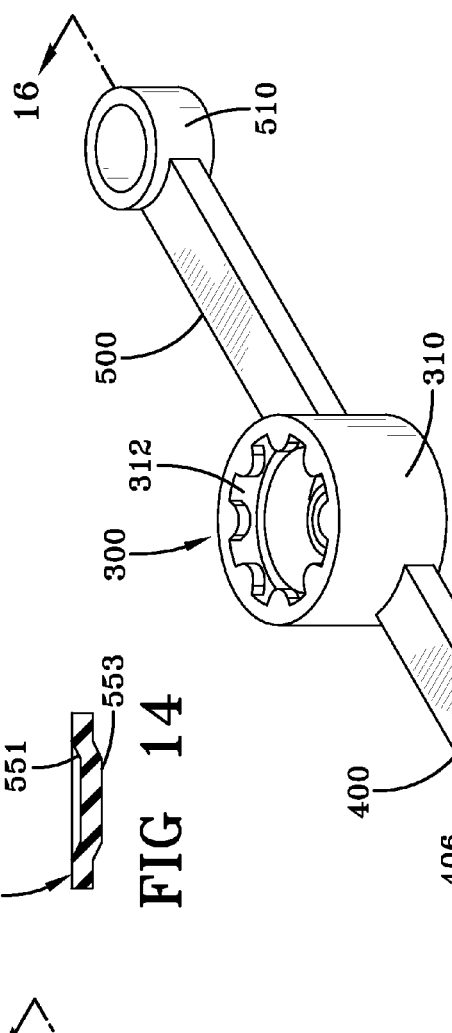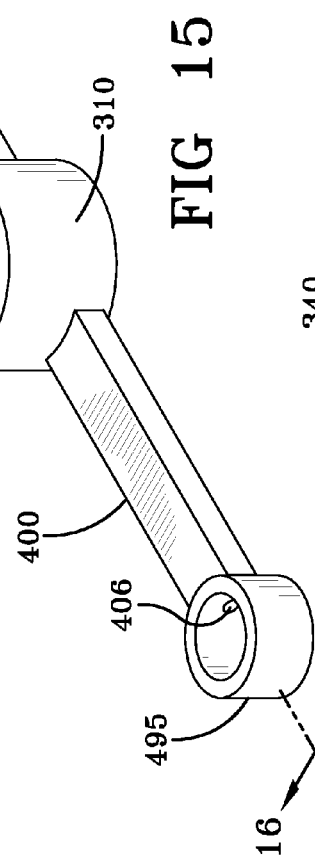

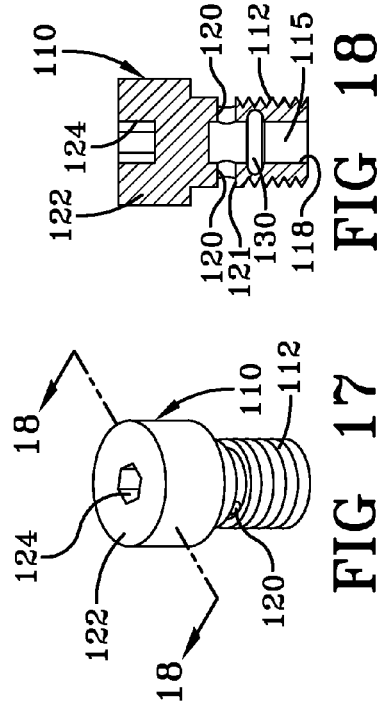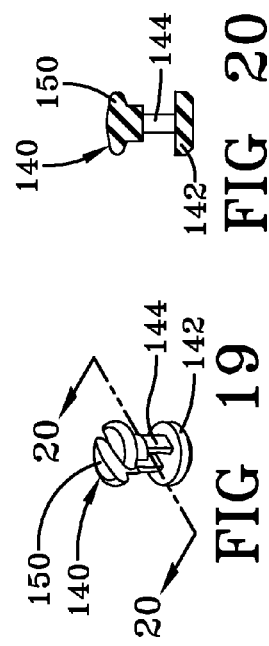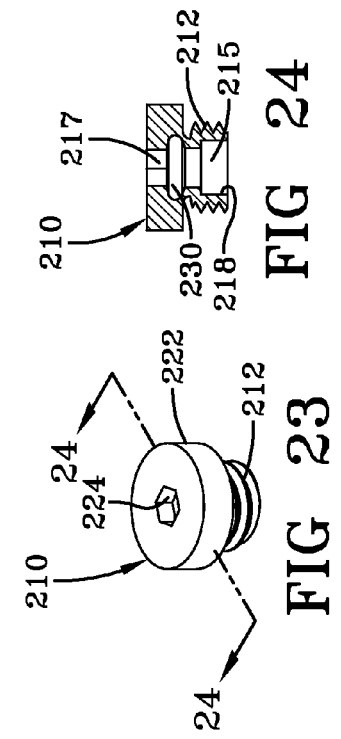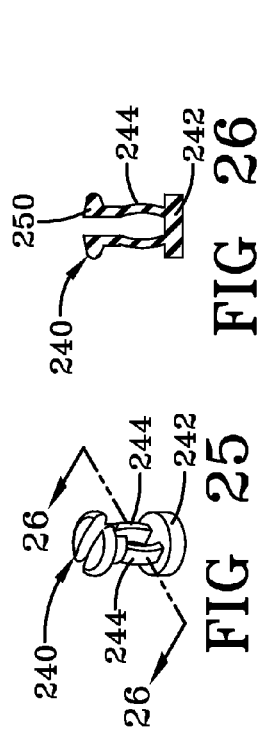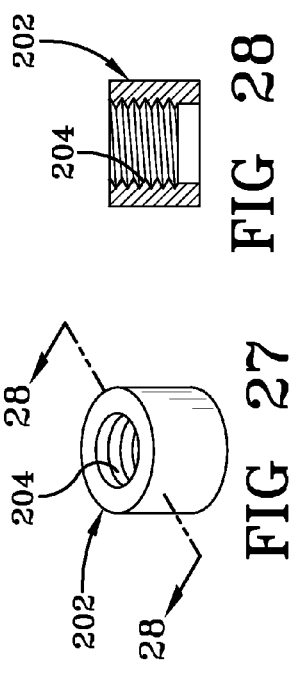

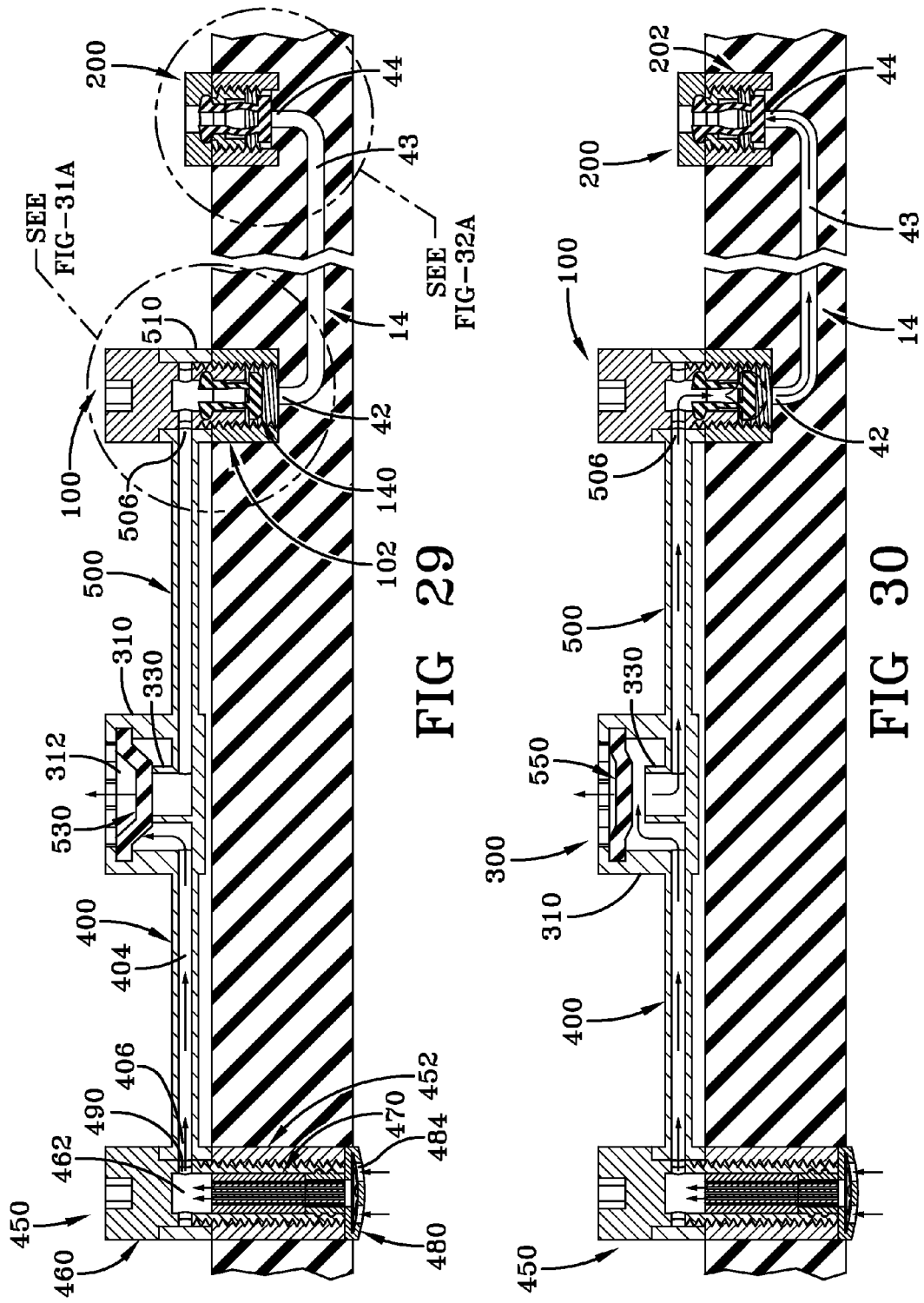

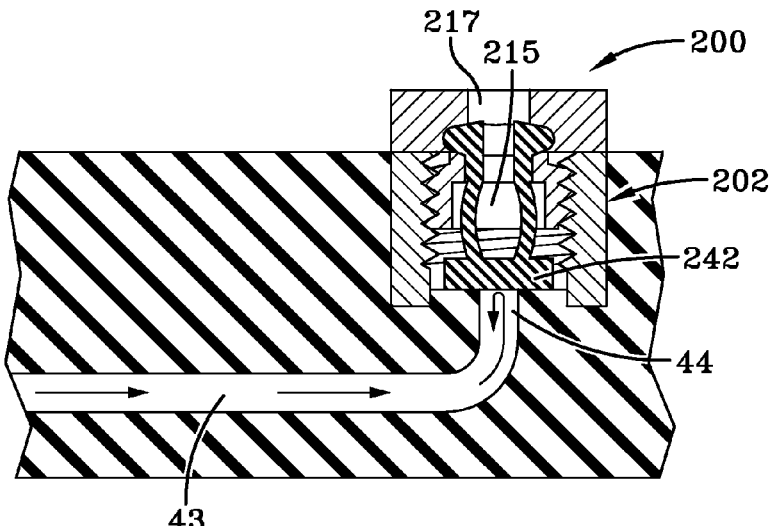
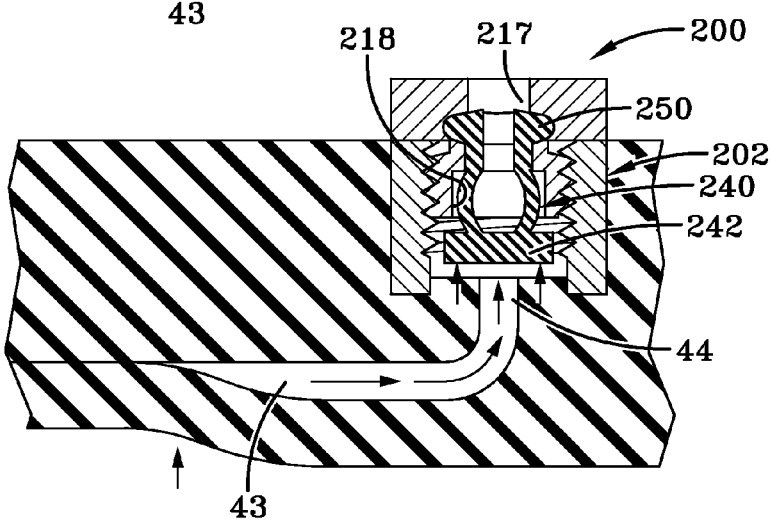
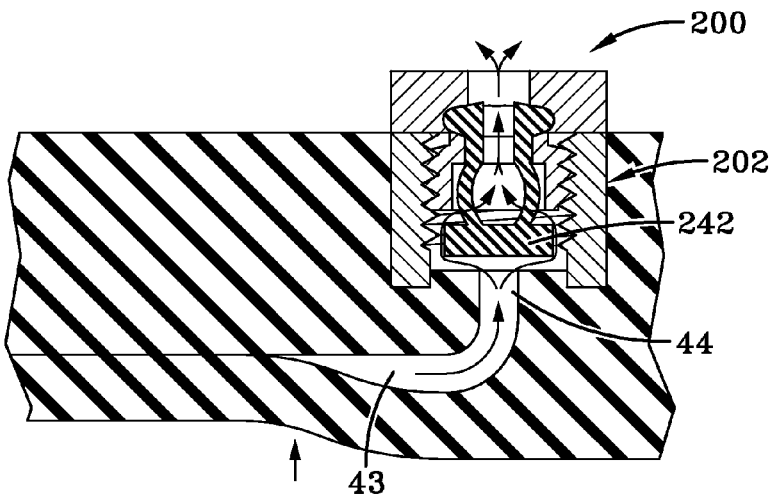

SELF-INFLATING TIRE AND PRESSURE REGULATOR

FIELD OF THE INVENTION

The invention relates generally to self-inflating tires and, more specifically, to a pump mechanism and pressure regulator for such tires.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate a self-inflating feature within a tire that will self-inflate the tire in order to compensate for any reduction in tire pressure over time without the need for driver intervention.

SUMMARY OF THE INVENTION

The invention provides a self-inflating tire assembly including a tire mounted to a rim, the tire having a tire cavity, first and second sidewalls extending respectively from first and second tire bead regions to a tire tread region; an air passageway having an inlet end and an outlet end, the air passageway being composed of a flexible material operative to open and close when the tire rotates, wherein the inlet end is connected to an outlet port of a regulator device, and the outlet end is in fluid communication with the tire cavity; the regulator device having a regulator body having an interior chamber; a pressure membrane is mounted in the interior chamber and positioned to open and close the outlet port mounted in the interior chamber, wherein the pressure membrane is in fluid communication with the tire cavity pressure wherein the body of the regulator device is connected to a first flexible duct having an internal passageway; wherein the first flexible duct has a first end connected to an inlet filter assembly, wherein the inlet filter assembly is in fluid communication with the outside air supply; wherein a second end of the first flexible duct is connected to an opening of the interior chamber of the regulator device.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of a surface, perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 4 is the perspective view of the air passage screw;

FIG. 5 is a section view in the direction 5-5 of FIG. 4;

FIG. 6 is a perspective view of the sleeve insert;

FIG. 7 is a section view in the direction 7-7 of the sleeve insert of FIG. 6;

FIG. 8 is a perspective view of the filter cap;

FIG. 9 is a perspective view of the top portion of the filter cap of FIG. 8;

FIG. 10 is a section view in the direction 10-10 of FIG. 8;

FIG. 11 is a perspective view of the filter;

FIG. 12 is a section view in the direction 12-12 of FIG. 11;

FIG. 13 is a perspective view of a regulator membrane;

FIG. 14 is a section view of the regulator membrane of FIG. 13 in the direction 14-14;

FIG. 15 is a perspective view of a regulator body;

FIG. 16 is a section view of the regulator body in the direction 16-16 of FIG. 15;

FIG. 17 is a perspective view of a valve body for the inlet valve;

FIG. 18 is a cross-sectional view of the valve body of FIG. 17 in the direction 18-18;

FIG. 19 is a perspective view of the inlet valve;

FIG. 20 is a section view of the inlet valve of FIG. 19 in the direction 20-20;

FIG. 21 is a perspective view of the inlet valve insert;

FIG. 22 is a cross-sectional view of the inlet valve insert of FIG. 21;

FIG. 23 is a perspective view of the outlet valve support;

FIG. 24 is a cross-sectional view of the outlet valve support of FIG. 23 in the direction 24-24;

FIG. 25 is a perspective view of the flexible stopper;

FIG. 26 is a section view of the flexible stopper of FIG. 25 in the direction 26-26;

FIG. 27 is a perspective view of the permanent valve insert;

FIG. 28 is a section view of the valve insert of FIG. 27;

FIG. 29 is a section view of FIG. 2 in the direction 29-29 showing the regulator in the closed position.

FIG. 30 is a section view of FIG. 2 in the direction 29-29 showing the regulator in the open position and the inlet control valve in the open position FIGS. 31 A-C illustrate the inlet control valve in the open position and closed position.

FIGS. 32 A-C illustrate the outlet control valve in the closed position (A) and the open position (B-C).

DETAILED DESCRIPTION OF THE INVENTION

Figure 1:
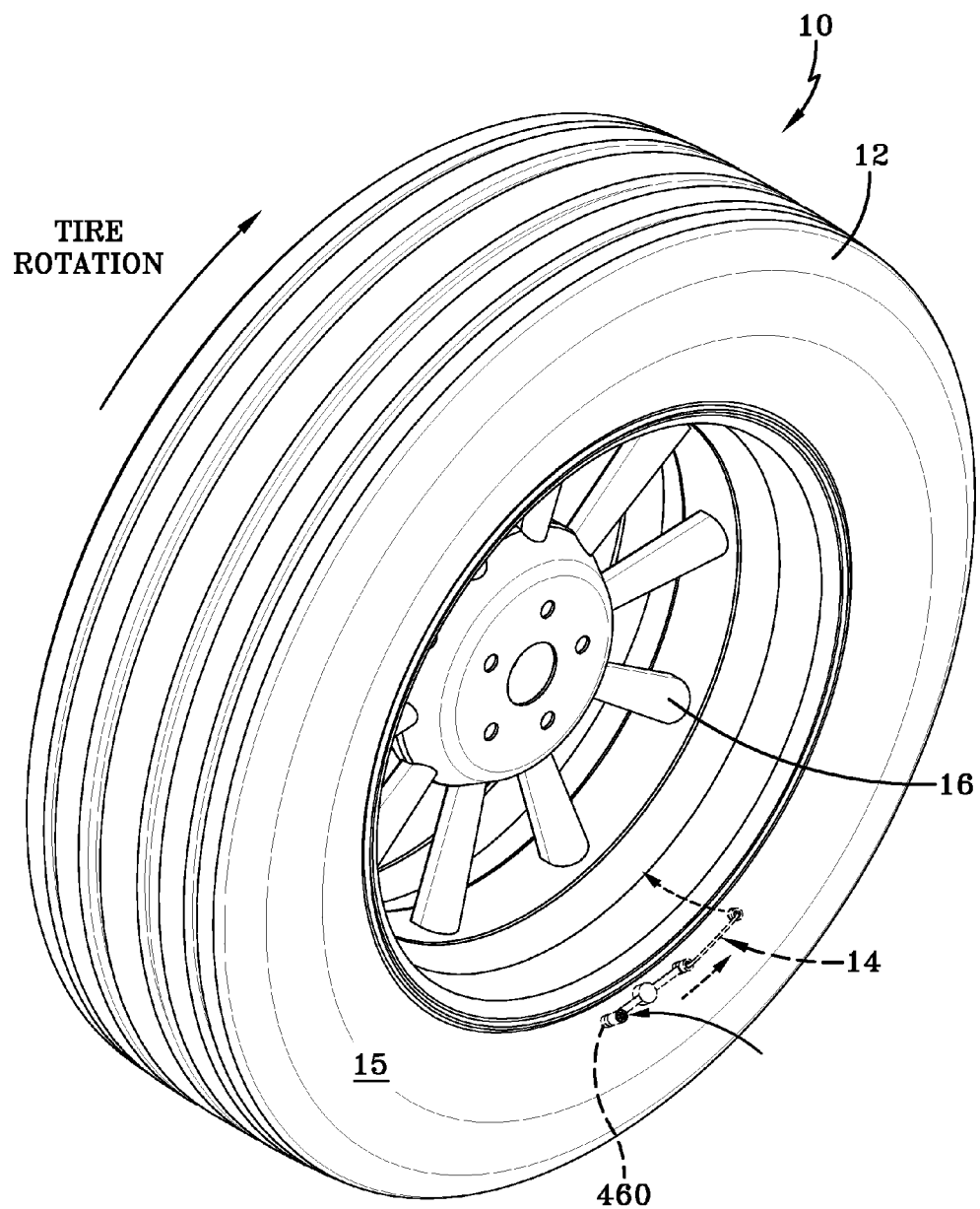
FIG. 1 is an isometric view of tire and rim assembly showing a pump and regulator assembly.
Figure 2:
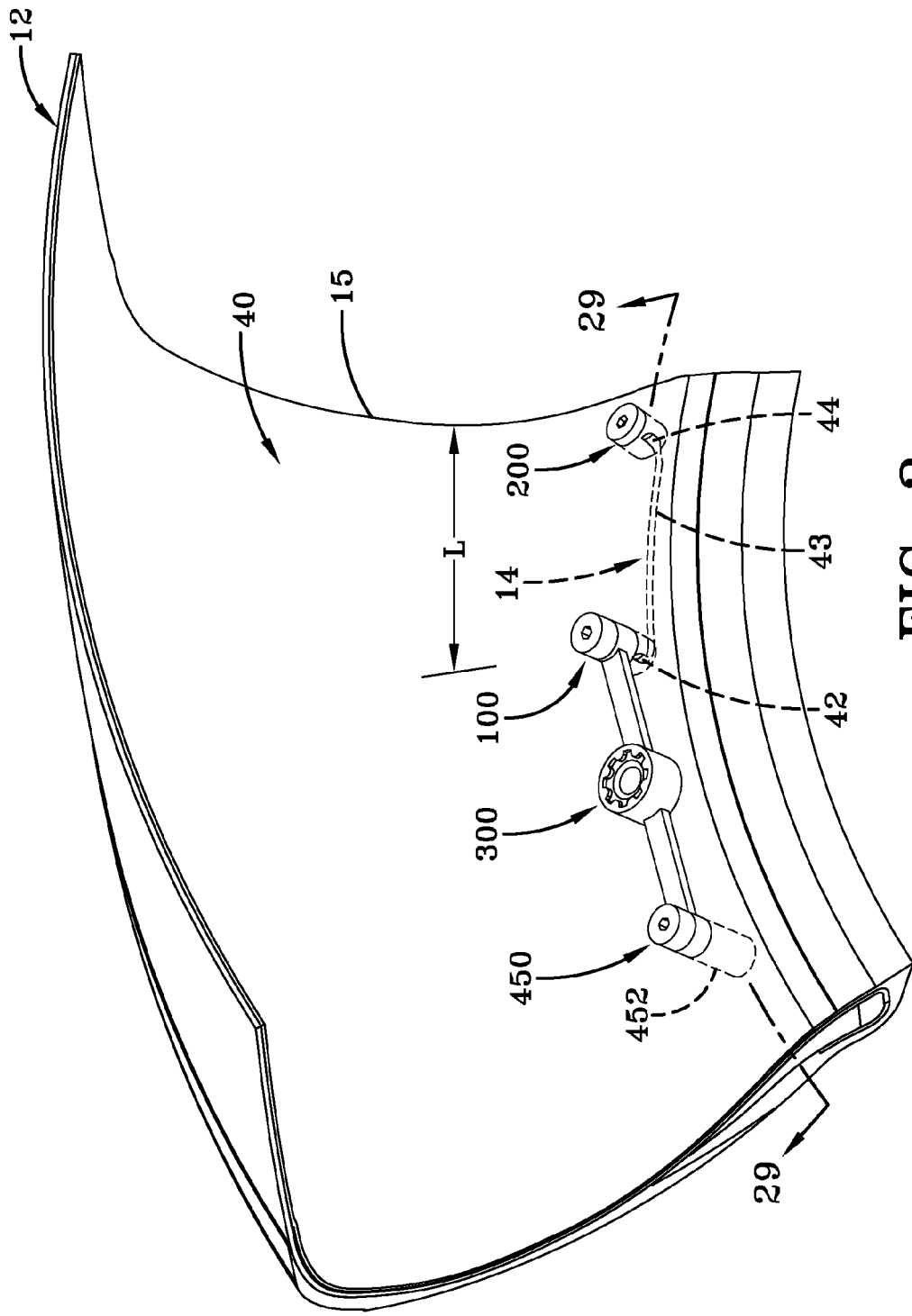
FIG. 2 is a front view of the pump and regulator assembly as shown from inside the tire of FIG. 1.

Referring to FIGS. 1 and 2, a tire assembly 10 includes a tire 12, a pump assembly 14, and a tire rim 16. The tire and rim enclose a tire cavity 40. As shown in FIGS. 1-2, the pump assembly 14 is preferably mounted into the sidewall area 15 of the tire, preferably near the bead region.

Pump Assembly 14

Figure 33:
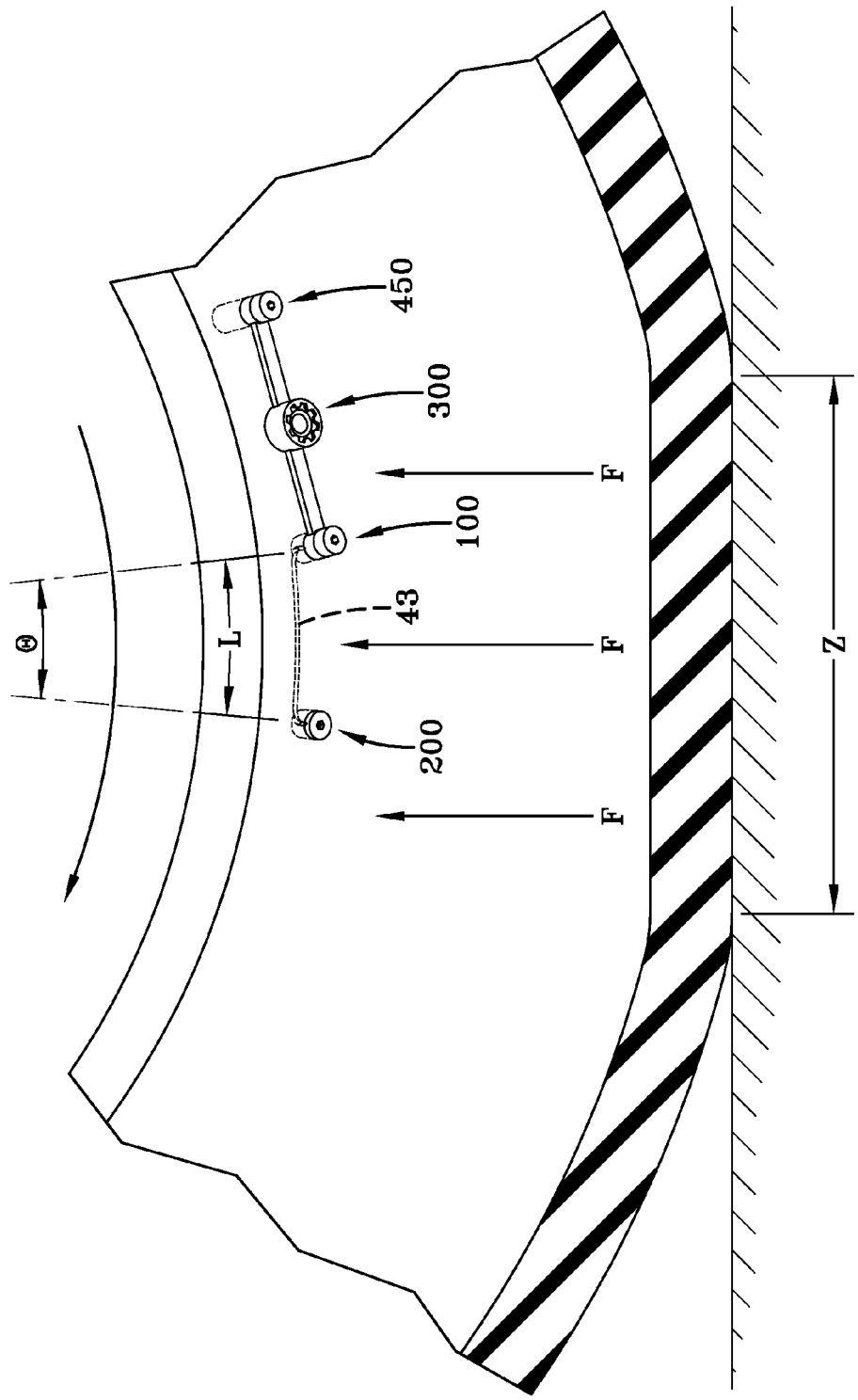
FIG. 33 is a partial view of the inside of the tire during operation, shown with the sidewall removed for clarity reasons.
Figure 35:
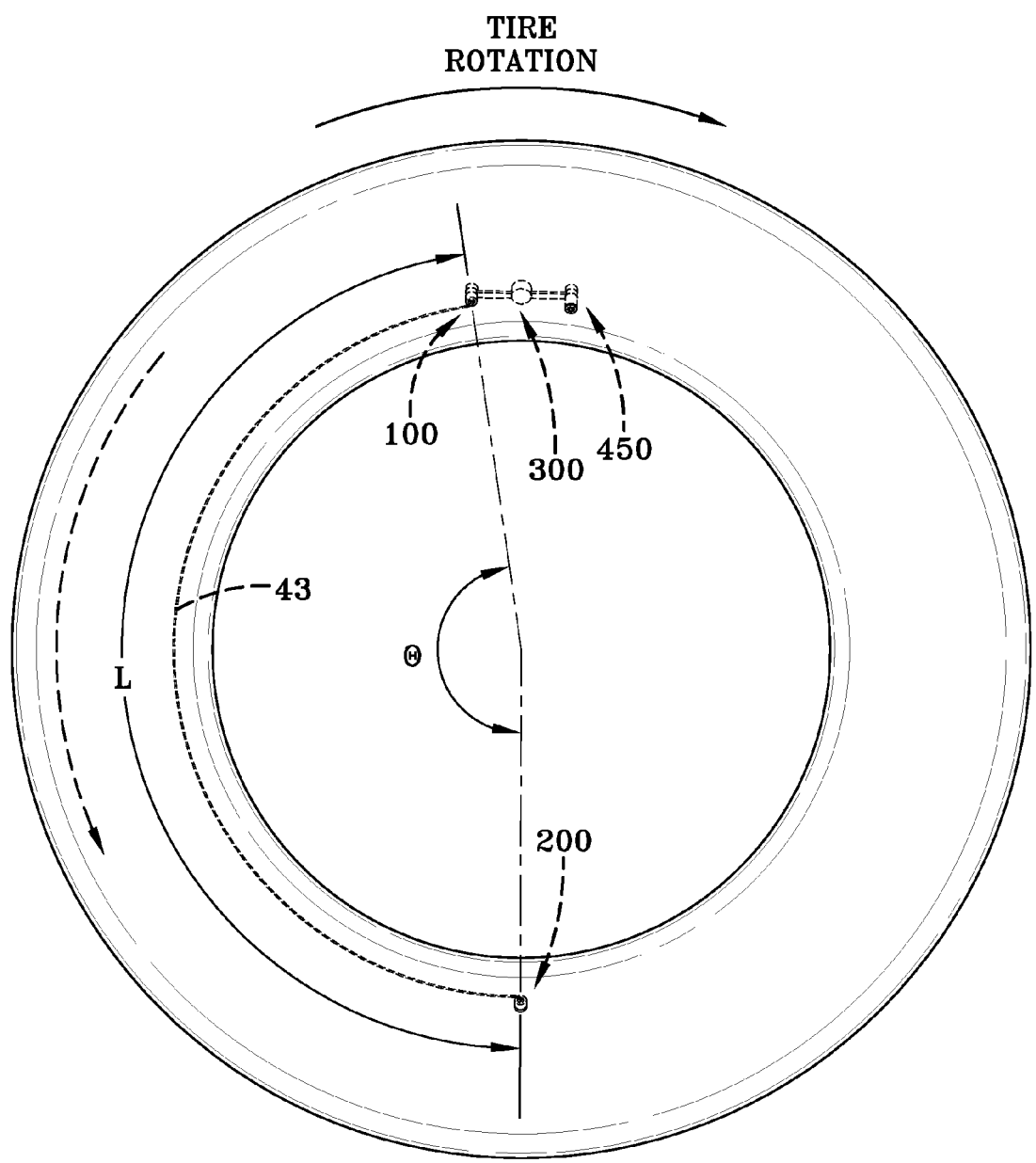
FIG. 35 illustrates a front view of a tire with a 180 degree pump shown in phantom.
Figure 36:
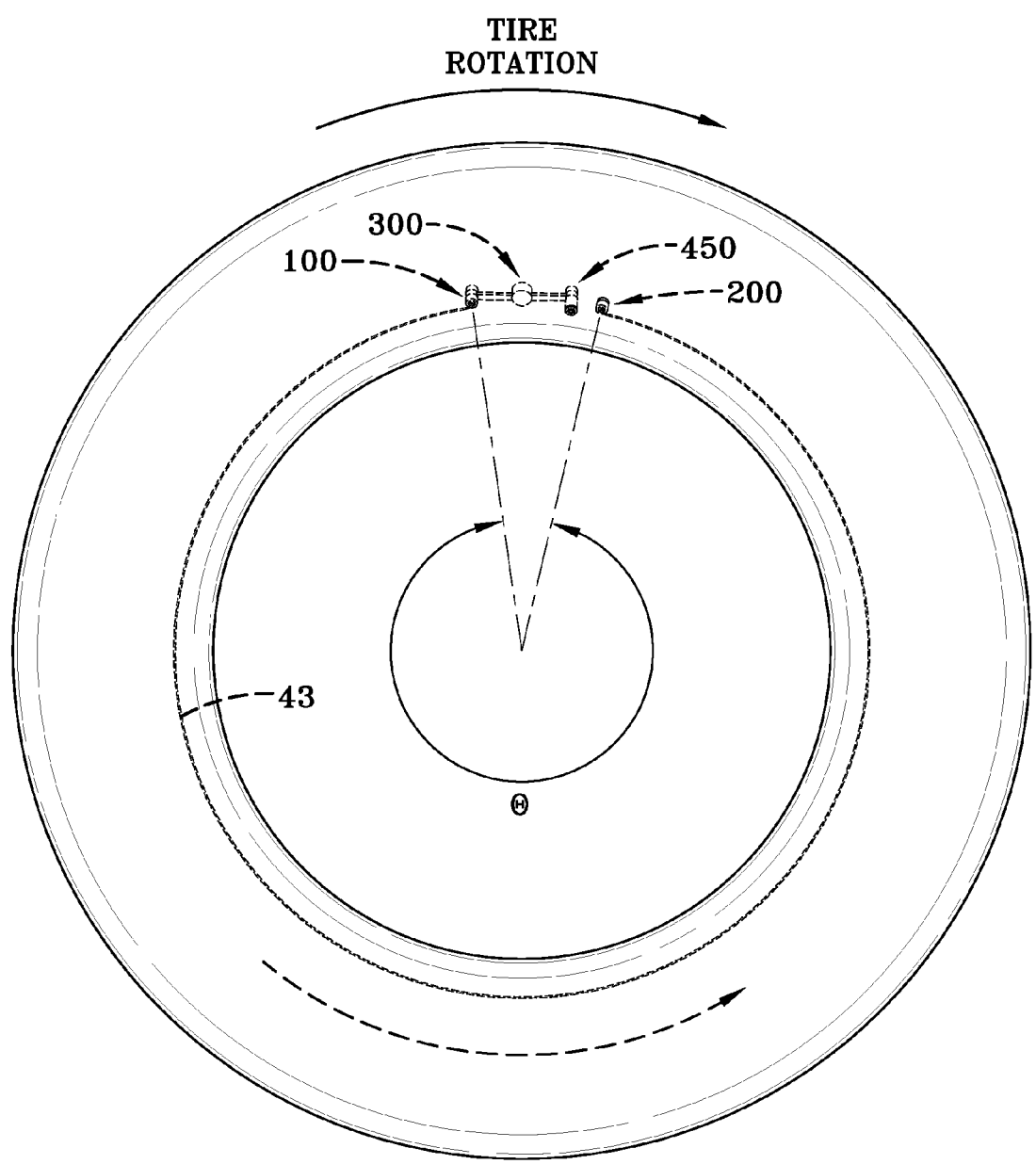
FIG. 36 illustrates a front view of a tire with a 340 degree pump shown in phantom.

The pump assembly 14 includes an air passageway 43 which may be molded into the sidewall of the tire during vulcanization or molded post cure. The air passageway has a length L that may extend in a circumferential direction, or any direction. The length L may range, and is preferably about the length of the tire footprint Z, as shown in FIG. 33. The length is typically about 20-40 degrees when the shorter length is used. Alternatively, the pump tube length may be any desired length, typically 20 degrees or more. FIG. 35 illustrates a pump tube length of about 180 degrees. FIG. 36 illustrates a pump tube length of about 340 degrees, and FIG. 36 illustrates a pump tube length of about 730 degrees. The pump air passageway 43 is comprised of a tube body formed of a resilient, flexible material such as plastic, elastomer or rubber compounds, and is capable of withstanding repeated deformation cycles when the tube is deformed into a flattened condition subject to external force and, upon removal of such force, returns to an original condition generally circular in cross-section. The tube is of a diameter sufficient to operatively pass a volume of air sufficient for the purposes described herein and allowing a positioning of the tube in an operable location within the tire assembly as will be described. Preferably, the tube has a circular cross-sectional shape, although other shapes such as elliptical may be utilized. The tube may be a discrete tube that is inserted into the tire during tire manufacturing, or the tube may be molded into shape by the presence of a removable strip that forms the passageway when removed.

The pump passageway 43 has an inlet end 42 connected to an inlet valve 100, and an outlet end 44 that is connected to an outlet valve 200. The inlet valve 100 is in fluid communication with a regulator device 300. The regulator device 300 is in fluid communication with an inlet filter assembly 450.

Regulator Device

The regulator device 300 is shown in FIGS. 13-16 and FIGS. 29-30. The regulator device 300 functions to regulate the flow of air to the pump 14. The regulator device 300 has a central regulator housing 310 that houses an interior chamber 320. The interior chamber 320 has a central opening 312. Opposite the central opening 312 is an outlet port 330. The outlet port is raised from the bottom surface 313 and extends into the interior of the chamber 320. The outlet port is positioned to engage a pressure membrane 550. The pressure membrane 550 is positioned within a recessed slot 340 formed in the sidewall 315 of the interior chamber 320. The pressure membrane is a disk shaped member made of a flexible material such as, but not limited to, rubber, elastomer, plastic or silicone. The pressure membrane is operable to open and close the outlet port 330. The outer surface 551 of the pressure membrane is in fluid communication with the pressure of the tire chamber 40 via central opening 312. The lower surface 553 of the pressure membrane is in fluid communication with the inlet air supplied from the inlet device 450, as described in more detail, below. Thus the balance of pressure forces on each side of the pressure membrane actuates the pressure membrane to open and close the outlet port 330.

Extending from the central regulator housing 310 is a first and second flexible duct 400, 500, positioned on either side of the central regulator housing 310. Each flexible duct 400,500 may be integrally formed with the regulator housing, or be a discrete part connected to the central regulator housing 310. Each flexible duct 400, 500 has an internal passageway 404, 504 for communicating fluid.

The internal passageway 404 of the first flexible duct 400 has a first end 402 that is in fluid communication with an opening 322 to the interior chamber 320. The internal passageway 404 of the first flexible duct 400 has a second end 406 that is in fluid communication with an inlet filter assembly 450. The inlet device 450 supplies outside filtered air to the regulator via the first flexible duct 400, and is described in more detail below.

The internal passageway 504 of the second flexible duct 500 has a first end 502 that is in fluid communication with the outlet port 330 of the interior chamber 320. The internal passageway 504 has a second end 506 in fluid communication with a directional valve 100. The directional valve 100 communicates flow to the pump passageway 43 and prevents backflow of air to the regulator device 300.

Inlet Filter Assembly

The inlet filter assembly 450 is shown in FIGS. 2-3, and 29-30, with its subcomponents shown in FIGS. 4-12. The inlet filter assembly 450 includes an insert sleeve 452 that is hollow and has an internal threaded bore 454. The insert sleeve 452 is inserted into the tire, typically in the sidewall 15. The insert sleeve 452 may be inserted into the tire post cure or may be molded into the tire as shown in FIG. 2. An air passage screw 460 has an outer threaded body 463 that is screwed into the internal threaded bore 454 of the insert sleeve. The air passage screw 460 has an internal passageway 462 having an opening 464. A filter 470 is inserted through opening 464 and is received in the internal passageway 462. A filter cap 480 has a threaded end 482 that is received in the opening 464 of the air passage screw 460. The filter cap is positioned on the outside surface of the tire, typically on the tire sidewall as shown in FIG. 1. The filter cap has a plurality of holes 484 for allowing the flow of air into the inlet filter 470. Outside air enters hole 484 and then through filter cap passageway 486 and then into and through filter 470. The filter air exits the filter 470 into the internal passageway 462 of the air passage screw 460. The air exits the internal passageway 462 through exit hole 490 and then into the inlet end of the first flexible duct 400. The distal end of the flexible duct 400 has a circular flange 495 surrounding a hole 410 through which the air passage screw is inserted. The exit hole 490 is located in a circumferential groove 491 to facilitate fluid communication with inlet hole 406 of the first flexible duct 400. The circular flange 495 functions like a sealing gasket if it is made of a flexible soft material like rubber.

Pump Inlet check valve

Figure 3:
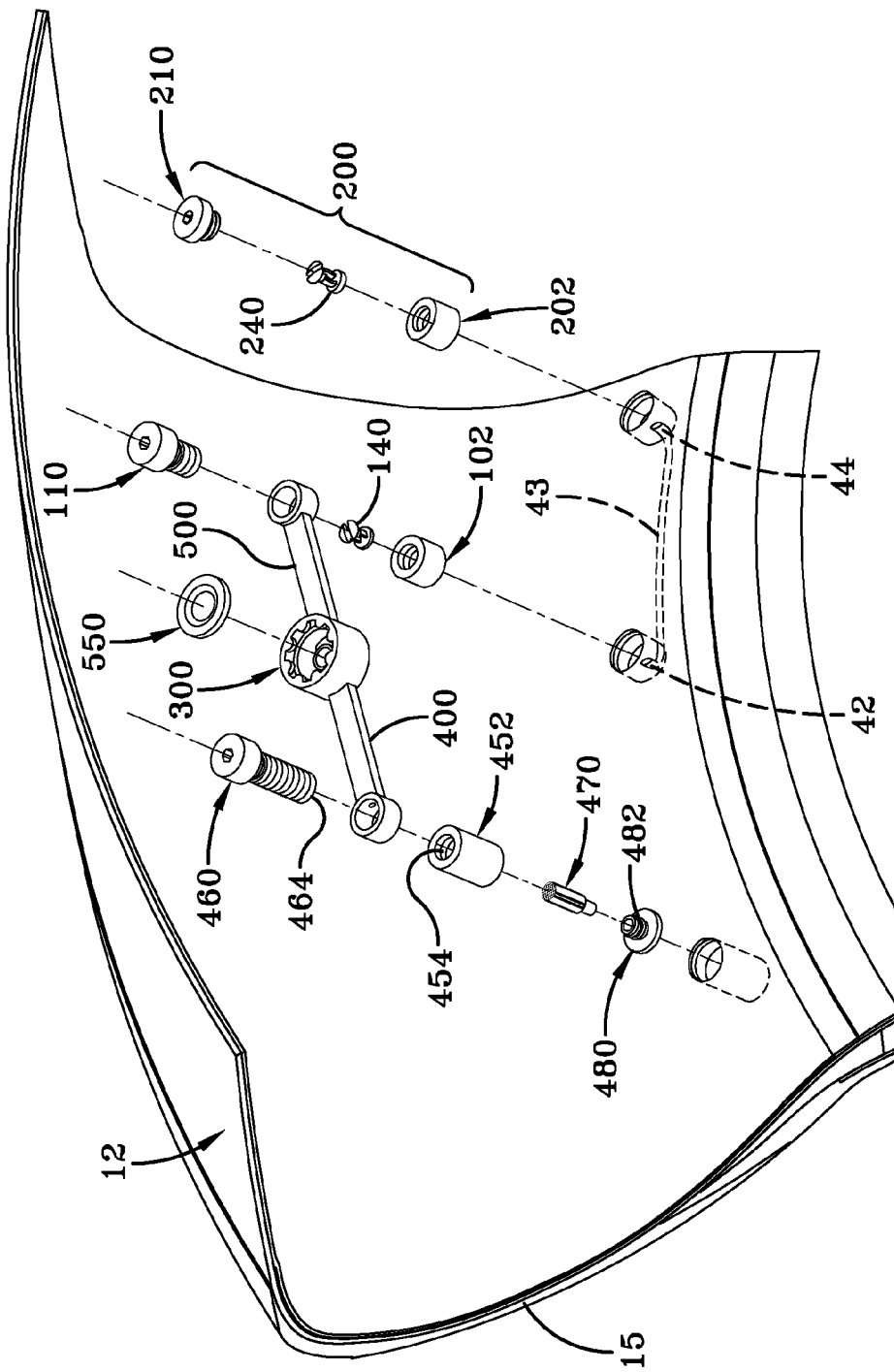
FIG. 3 is an exploded view of the pump and regulator assembly of FIG. 2.

A pump inlet check valve 100 that communicates with the regulator 300 is shown in FIGS. 29-31 and in FIGS. 17-22. The pump inlet check valve 100 includes an insert sleeve 102 that is inserted into the tire on an interior surface, typically the inner sidewall as shown in FIG. 3. The insert sleeve 102 has an internal threaded bore 104. The insert sleeve 102 may be molded into the tire 12 or inserted post cure. The insert is installed in the tire area so that the internal bore 104 is in fluid communication with an inlet end 42 of the pump passageway 43. A valve body 110 has an outer threaded surface 112 that is received within insert 102. The valve body 110 has a central passage 115 that has a first opening 118 that is in fluid communication with the insert sleeve bore 104 and the pump passageway 43 inlet end 42 when inserted into the tire. The central passage 115 has two opposed holes 120 located in a circumferential groove 121 near the head 122 of the valve body 110. The head 122 has a shaped head bore 124 such as a hexagonal head for receiving a mating tool such as an allen wrench, useful for tightening the valve body 110 inside the sleeve 102. The central passage 115 further includes a retainer slot 130 for receiving flexible stopper 140. The flexible stopper 140 is preferably made of a resilient material such as rubber, silicone, or an elastomer. The flexible stopper 140 has a disk shaped lower end 142, and two opposed legs 144 which extend from the lower end 142. Each leg 144 has a shoe 150 which has a curved enlarged shape and is made of a resilient material. As shown, the shoe is a semi-circle, although other shapes would work for the invention. Although the flexible stopper 140 is shown with two legs 144, the stopper could have a single leg 144 with a shoe thereon, and the shoe could be annular with holes that allow passage of air therethrough.

The pump inlet check valve 100 may also be other types of check valves such as ball spring valves, duckbill, as known to those skilled in the art.

The disk shaped lower end 142 of the flexible stopper is seated on the valve body distal end and the legs 144 extend into the passage 115. Each shoe 150 is received in the annular retainer slot 130. The disk lower end 142 is positioned to seal the opening 118 of the central passage 115.

Figure 31A:
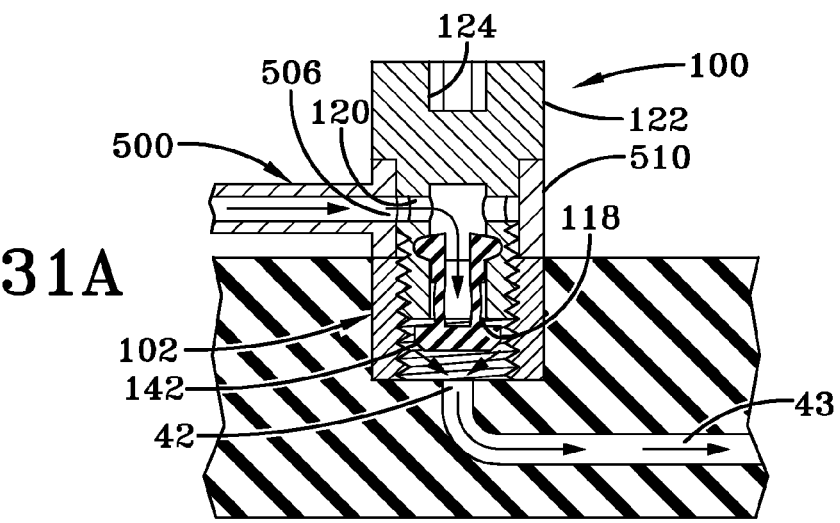
Figure 31B:
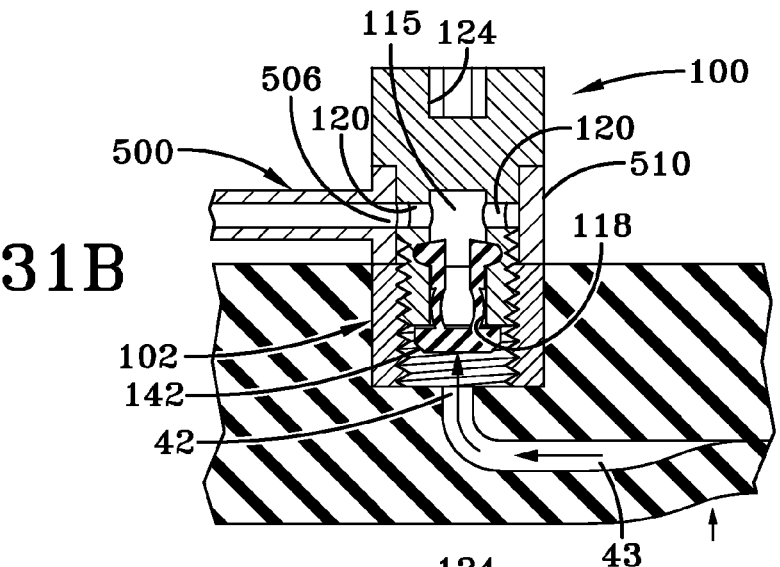
Figure 31C:
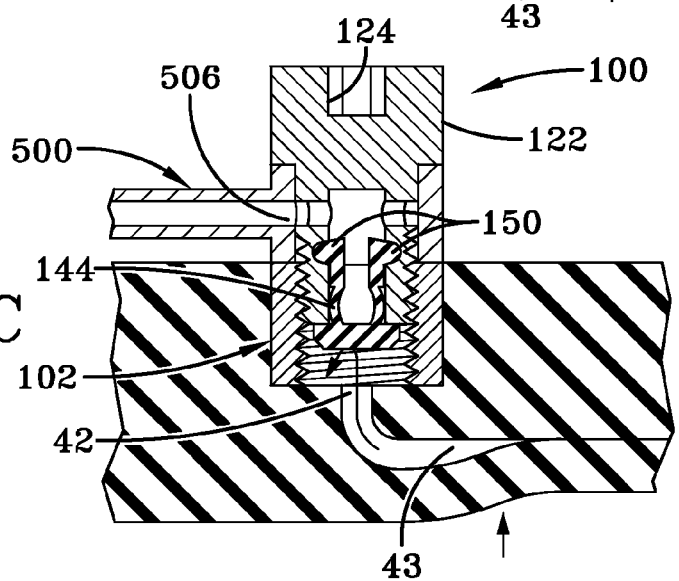

FIGS. 31A-C illustrate the pump inlet check valve 100 installed and operational. FIG. 31A illustrates flow from the regulator, through the pump inlet check valve 100 and to the pump inlet 42. The disk lower end 142 of the flexible stopper 140 does not seal the central passage 115 when the flow direction is towards the pump 43. FIG. 31B illustrates the disk lower end 142 of the flexible stopper 140 sealing the central passage 115 so that no flow travels in the reverse direction from the pump to the regulator. FIG. 31C illustrates the disk lower end 142 of the flexible stopper 140 sealing the central passage 115 as the valve is being cracked open upon flow reversal.

Pump Outlet Check Valve

As described above, a first end 42 of the pump is connected to a regulator and a check valve. The second end 44 of the pump is connected to a pump outlet valve 200. The pump outlet valve is shown in FIGS. 29-30, 32 and in FIGS. 23-28. The pump outlet valve 200 includes an insert sleeve 202 that is inserted into the tire on an interior surface, typically the inner sidewall as shown in FIG. 3. The insert sleeve 202 has an internal threaded bore 204. The insert sleeve 202 may be molded into the tire 12 or inserted post cure. The insert is installed in the tire area so that the internal bore 204 is in fluid communication with the pump outlet end 44. A valve body 210 has an outer threaded surface 212 that is received within insert 202. The valve body 210 has a central passage 215 that has a first opening 218 that is in fluid communication with the insert sleeve bore 204 and the pump passageway 43 outlet end 44 when inserted into the tire. The central passage 215 has an outlet end 217 that is in fluid communication with the tire cavity. The valve body has a shaped head 222 such as a hexagonal shaped head bore 224 for receiving a mating tool such as an allen wrench useful for tightening the valve body 210 inside the sleeve 202. The central passage 215 further includes a retainer slot 230 for receiving flexible stopper 240. The flexible stopper 240 is preferably made of a resilient material such as rubber, silicone, or an elastomer. The flexible stopper 240 has a disk shaped lower end 242, and two opposed legs 244 which extend from the lower end 242. Each leg 244 has a shoe 250 which has a curved enlarged shape and is made of a resilient material. As shown, the shoe is a semi-circle, although other shapes would work for the invention. Although the flexible stopper 240 is shown with two legs 244, the stopper could have a single leg 244 with a shoe thereon, and the shoe could be annular with holes that allow passage of air therethrough.

The flexible stopper is mounted inside the central passage so that each shoe 250 of the flexible stopper is received in the annular retainer slot 230, and the disk lower end 242 is positioned to open and close the pump end 44.

FIGS. 32A-C illustrate the pump outlet valve 200 installed and operational. FIG. 32C illustrates flow from the pump outlet 44 to the pump outlet valve 200. The disk lower end 242 of the flexible stopper 240 does not seal the pump outlet 44 when the flow direction is towards the pump outlet valve 200. The flow travels through the central passage 215, around and through the legs 244 and exits the passage outlet 217 to the tire cavity. FIG. 32A illustrates the disk lower end 142 of the flexible stopper 140 sealing the pump end 44 so that flow is blocked from flowing to the cavity. This occurs when the pump is not pumping. FIG. 32B illustrates the disk lower end 142 of the flexible stopper 140 being lifted by the valve cracking pressure when the pump starts pumping.

System Operation

As will be appreciated from FIG. 33, the regulator device 300 is in fluid communication with the inlet end of the pump passageway 43. As the tire rotates, a footprint is formed against the ground surface. A compressive force F is directed into the tire from the footprint and acts to flatten the pump passageway 43. Flattening of the pump passageway 43 forces the pumped air towards the pump outlet device 200. Any flow that is directed towards the regulator 300 is blocked from entering the regulator by the pump inlet check valve 100 as shown in FIG. 31B. Due to the increase in pressure at the pump outlet 44, the pressure unseats the disk 242 from the opening of the pump outlet 44, which allows the pumped air to exit the pump outlet device through passage 215 into the tire cavity 40.

The regulator device 300 controls the inflow of outside air into the pump. If the tire pressure is low, the membrane 550 in the regulator device 300 is responsive to the tire pressure in the tire cavity 40. If the cavity pressure falls below a preset threshold value, the membrane will unseat from the central outlet port 330. Outside air will enter the filter assembly 450, exit through the filter and enter the first flexible duct 400. The flow then exits the first flexible duct and enters the regulator chamber and then into the second flexible duct, through the regulator check valve, and then into the pump inlet. The flow is then compressed through the pump and then exits the pump outlet valve into the tire cavity. The pump will pump air with each tire rotation. The pump passageway 43 fills with air when the pump system is not in the footprint.

If the tire pressure is sufficient, the regulator device will block flow from entering the pump inlet. The pressure membrane is responsive to the cavity tire pressure and engages the central port 330 forming a seal which prevents air flow from passing through the regulator device. The pressure membrane material properties are adjusted to have the desired tire pressure settings.

Figure 34:
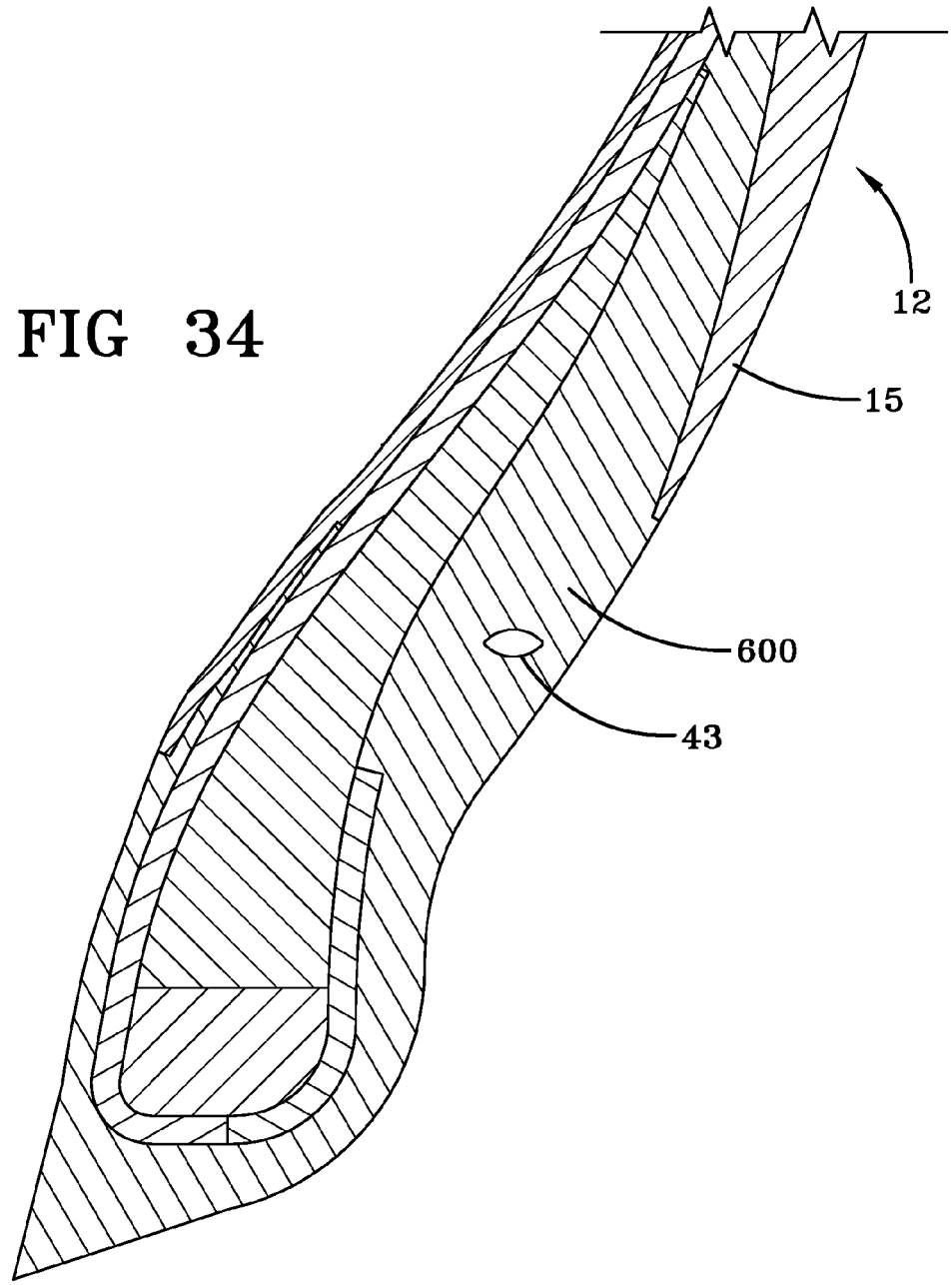
FIG. 34 is a partial view of a tire showing the sidewall cross-section and the air passageway.

The location of the pump assembly in the tire will be understood from FIGS. 1 and 34. In one embodiment, the pump assembly 14 is positioned in the tire sidewall, radially outward of the rim flange surface in the chafer 600. So positioned, the air passageway 43 is radially inward from the tire footprint and is thus positioned to be flattened by forces directed from the tire footprint as described above. Although the positioning of the air passageway 43 is specifically shown in a chafer 600 of the tire near the bead region, it is not limited to same, and may be located at any region of the tire that undergoes cyclical compression. The cross-sectional shape of the air passageway 43 may be elliptical or round.

Figure 37:
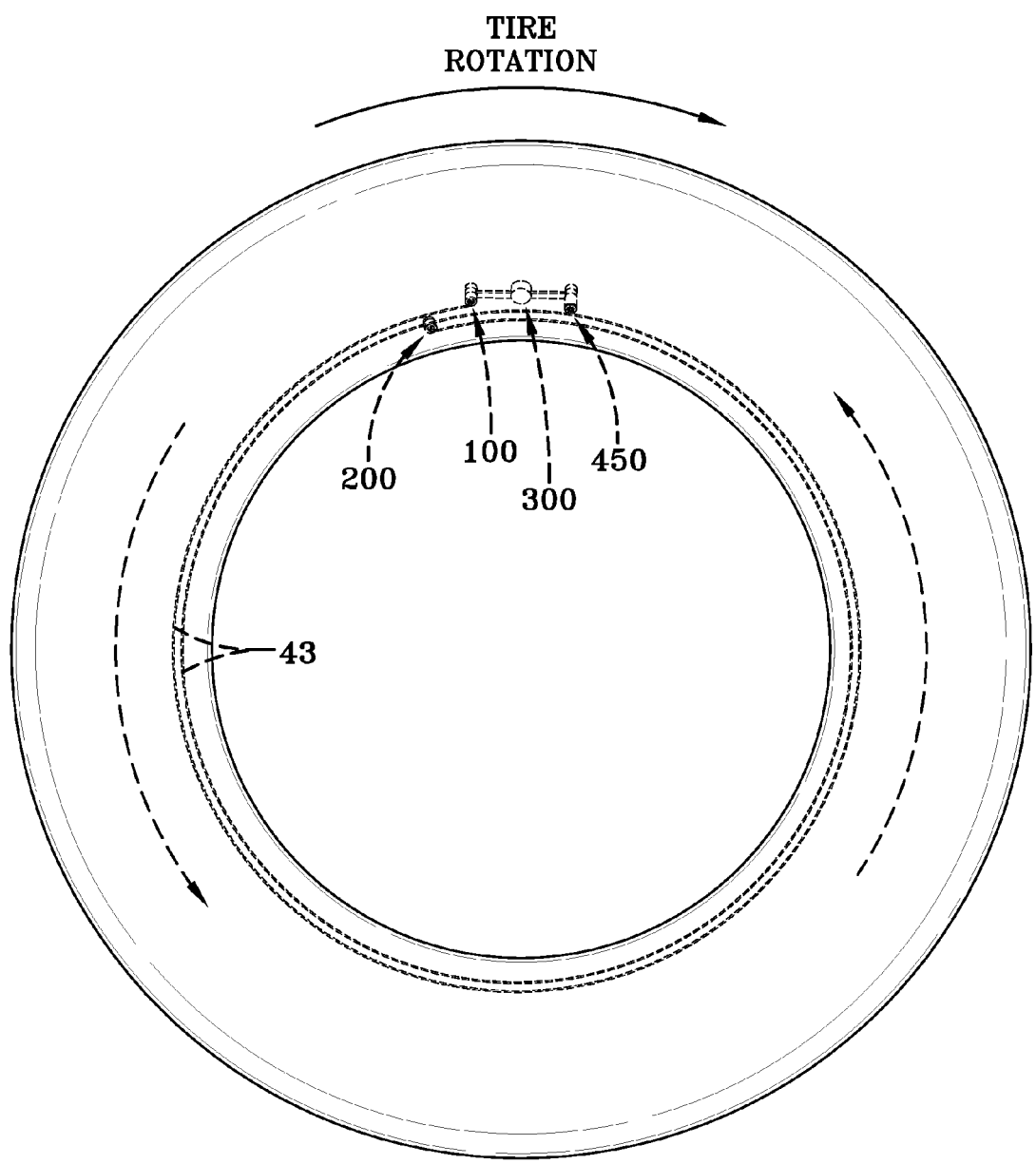
FIG. 37 illustrates a front view of a tire shown with a 730 degree pump shown in phantom.

As described above, the length L of the pump passageway may be about the size of the tire's footprint length Z. However, the invention is not limited to same, and may be shorter or longer as desired. See FIG. 35 which illustrates an approximate 180 degree length, FIG. 36 which illustrates an approximate 340 degree length, and FIG. 37 which illustrates a 730 degree length. As the length of the pump increases, the pump passageway will need to substantially open and close like a peristaltic pump.

The pump assembly 14 may also be used with a secondary tire pressure monitoring system (TPMS) (not shown) of conventional configuration that serves as a system fault detector. The TPMS may be used to detect any fault in the self-inflation system of the tire assembly and alert the user of such a condition.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
    a tire mounted to a rim, the tire having a tire cavity, first and second sidewalls extending respectively from first and second tire bead regions to a tire tread region;
    an air passageway having an inlet end and an outlet end, the air passageway being composed of a flexible material operative to open and close when the tire rotates, wherein the inlet end is connected to an outlet port of a regulator device, and the outlet end is in fluid communication with the tire cavity;
    the regulator device having a regulator body having an interior chamber; a pressure membrane is mounted in the interior chamber and positioned to open and close the outlet port mounted in the interior chamber, wherein the pressure membrane is in fluid communication with the tire cavity pressure;
    wherein the body of the regulator device is connected to a first flexible duct having an internal passageway; wherein the first flexible duct has a first end connected to an inlet filter assembly, wherein the inlet filter assembly is in fluid communication with the outside air supply; wherein a second end of the first flexible duct is connected to an opening of the interior chamber of the regulator device.

2. The self-inflating tire assembly of claim 1 wherein the air passageway is located in the sidewall of the tire.

3. The self-inflating tire assembly of claim 1 wherein the body of the regulator device is connected to a second flexible duct, wherein the second flexible duct has a first end in fluid communication with the outlet port of the regulator body, and a second end in fluid communication with the inlet end of the air passageway.

4. The self-inflating tire assembly of claim 1 wherein the regulator body is not affixed to the tire.

5. The self inflating tire assembly of claim 3 wherein the assembly further includes an inlet check valve connected to the second end of the second flexible duct, wherein the inlet check valve is mounted to the tire.

6. The self-inflating tire assembly of claim 3 wherein the first and second flexible duct each have an internal passageway in fluid communication with the regulator interior chamber.

7. The self-inflating tire assembly of claim 1, wherein the length of the air passageway is greater than 10 degrees.

8. The self-inflating tire assembly of claim 1, wherein the length of the air passageway is about the same as the length of the tire footprint.

9. The self-inflating tire assembly of claim 1, wherein the length of the air passageway is in the range of about 10 to about 30 degrees.

10. The self-inflating tire assembly of claim 1, wherein the air passageway is substantially of elliptical in cross-section.

11. The self-inflating tire assembly of claim 1, wherein the air passageway is positioned in the chafer.

12. The self-inflating tire assembly of claim 1, wherein the air passageway is positioned between a tire bead region and the rim tire mounting surface radially inward of the tire tread region.

13. The self-inflating tire assembly of claim 1, wherein an outlet check valve is located between the outlet of the air passageway and the tire cavity.

14. The self-inflating tire assembly of claim 13 wherein the outlet check valve is mounted to the tire.

15. The self-inflating tire assembly of claim 1 wherein the inlet filter assembly has an insert sleeve affixed to the tire sidewall, wherein the insert sleeve has an internally threaded bore that extends completely therethrough, wherein the internal bore has a first end in the tire cavity and a second end open to the ambient air outside the tire, an air passage screw having an internal passageway is received in the first end of the insert sleeve, a filter is received within the internal passageway of the air passage screw.

16. The self-inflating tire assembly of claim 13 wherein the outlet check valve has an insert sleeve affixed to the tire sidewall, wherein the insert sleeve has an internally threaded bore that extends completely therethrough, wherein the internal bore has a first end open to the tire cavity, and a second end connected to the air passageway outlet end, wherein a flexible stopper is received in the internal bore.

17. The self inflating tire assembly of claim 16 wherein the flexible stopper has a disk shaped lower end that is positioned to open and close the air passageway outlet end.

\* \* \* \* \*